United States Patent Office 2,743,160
Patented Apr. 24, 1956

2,743,160

PREPARATION OF ALKALI METAL DOUBLE FLUORIDES OF ZIRCONIUM AND HAFNIUM

Eugene Wainer, Cleveland Heights, Ohio, assignor, by mesne assignments, to the United States of America as represented by the United States Atomic Energy Commission No Drawing. Application January 31, 1952, Serial No. 269,146

5 Claims. (Cl. 23—88)

The alkali metal double fluorides of zirconium and hafnium have become of increasing importance technologically. The alkali double fluorides are used as fluxes in ferrous and non-ferrous metallurgy and may be used as a source of pure zirconium metal. In addition, in view of the ease with which the product may be purified by recrystallization, it represents an ideal means for preparation of other chemically pure compounds using such material as the starting agent.

In accordance with the present invention, there is disclosed an improved and simplified procedure for making such compounds with the material advantages as to costs, etc. Other objects and advantages will appear from the following description.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

In accordance with the objects referred to, I have discovered that the zirconium content of various oxide and silicate compounds may be converted into water-soluble alkali metal zirconium double fluoride salts by first decomposing the zirconium ore with lime compounds and subsequently treating the finely comminuted lime derivative of the zirconium ore with a mixture of acids and the appropriate water soluble fluorides. The advantage of this procedure is the ability to obtain substantially quantitative decomposition of the ore in an easily controllable manner, but more important an exceptionally high degree of purity can be expected.

Heretofore in the art, water soluble alkali metal double fluoride compounds of zirconium have been known and various methods of preparation have been described. In general, these methods have involved the formation of a concentrated acid fluoride solution of zirconium and precipitating the double fluoride salt from this solution by the addition of an alkali metal fluoride. My process bypasses the separate step of formation of the concentrated acid fluoride solution, and through the medium of double decomposition and chemical destruction of an originally insoluble compound of zirconium, the desired end product is obtained directly. In this manner, no excess water-soluble fluoride salts are required, and the result is that these double fluoride compounds may be dissolved in water away from the associated impurities, and subsequently may be separated in pure form by known recrystallization methods.

In Patent 2,418,074, a method is described for preparation of potassium zirconium fluoride through a high temperature reaction between potassium silico fluoride and zirconium silicate. This process exhibits several disadvantages. The first is that the yields are generally below 90%; secondly, if the sintering is prolonged or goes to too high a temperature even for a short time, there is a substantial loss of the expensive fluorine component in the form of silicon tetrafluoride, and this loss makes low efficiency of operation. However, much more important than this is the fact that the yields are exceptionally low in those cases where weathered zircon ores are treated, such as the baddeleyites, zircites, and the like, where the zirconium oxide content is in excess of 65%. The reason for these low yields is at first sight puzzling, but investigation of the reaction shows that through heating of an alkali silicofluoride and a zirconium oxide ore containing in excess of 65% zircon there are formed insoluble and non-decomposable zirconium silicate in well recrystallized form. Quite evidently, a second reaction takes place in which silicon tetrafluoride reacts with the zirconium oxide, and in the presence of the alkali metal provided by the original alkali metal fluosilicate, forms by mineralizing procedures, the mineral zirconium silicate or zircon. This represents a serious loss.

In the novel procedure I have developed, this possibility for loss of fluorine and for low yields as a result of formation of zircon is bypassed entirely in view of the fact that this fluorination reaction is carried out at temperatures of the order of 100° C. or less at which temperature it is not possible to form the silicon tetrafluoride in active form as a gas.

The usual zirconium ores of commerce are all suitable for the purposes of my invention. The most common ore is zircon which consists substantially of 65% zirconium oxide and 35% silica. Technical grades of such ores may contain 1 to 3% titanium dioxide, 1 to 2% aluminum oxide, iron oxide, and other miscellaneous impurities. Other common ores of zirconia are baddeleyite, occasionally called zircite. Baddeleyites are compounds of zirconia, iron and silica. The zirconia content of baddeleyite extends from 65% up to about 95%. The iron content extends from substantially zero up to about 20% and the balance is usually chiefly silica with small amounts of aluminum, calcium, magnesium, and the like. The zirconium silicate is available in two forms, as a beach sand purified by mechanical methods of separation, and as a massive ore in which the composition is usually quite complex and contains in addition to zirconium oxide a substantial amount of rare earths. The most readily available and common ore of zirconia, as has been indicated, is the mineral zircon. As stated before, my novel procedure is applicable to all of these types of ores.

In preparing the zirconia-containing ore for the purposes of eventual decomposition to the complex fluoride, the ore is ground to —325 mesh (Tyler standard). It is then mixed with an alkaline earth compound which can form an insoluble sulfate e. g., a compound of calcium, barium, or strontium, and preferably limestone or calcium carbonate of equivalent fineness in the ratio of one mole of limestone per mole of zirconia and one mole of limestone per mole of silica. If iron or other metallic impurities are present, there is no need to add limestone to compensate for the presence of these impurities. The important requirement is that the sum molar total of zirconia and silica be equivalent stoichiometrically to the limestone added. In addition to the limestone, calcium chloride is also added to the mix in amounts equivalent to 10 molar per cent of the amount of limestone used. These materials are ground thoroughly together, and then calcined for instance at about 2400° F. for one hour. Longer periods of calcination at temperatures as low as 2200° F. are also effective, so that a usual general description of the conditions of calcination are a temperature range of 2200° to 2400° F. for periods ranging from one to three hours. Suitable equipment for this calcination operation is a semi-muffle furnace or a rotary kiln. After calcination, the material is cooled and then ground to —325 mesh.

After grinding, the calcium zirconium silicate complex which is formed as a result of the calcination is then slurried with water, which usually involves the addition of 5 parts by weight of water to one part by weight of solid. Then concentrated sulfuric acid is mixed with the batch in definite amounts as rapidly as possible and a violent exothermic reaction takes place in a few minutes, which results in a solidification of the slurry and the evolution of large amounts of steam. Depending on the size of the batch used, it is necessary to adjust the amount of water so that the reaction does not go to complete dryness. After the batch is cooled down, the gelatinous mass is broken up and water is added so that a stirrable suspension is obtained.

After vigorous stirring for several minutes to complete the breaking up of the product, a mixture of water-soluble fluorides is added. These water-soluble fluorides are of the alkali metal class, the most practical ones being sodium fluoride, ammonium fluoride, or potassium fluoride or combinations of the three. For example, when it is desired to prepare potassium zirconium fluoride compound, a desirable mixture of fluorides is in the ratio of 4 moles of sodium fluoride to two moles of potassium fluoride; or if desired, six moles of potassium fluoride may be used per mole of the calcium zirconium silicate complex. These fluorides are added in fairly concentrated solution.

The amount of sulfuric added is to a certain extent dependent on the constitution of the reactants. One mole of sulfuric acid is added per each mole of lime present and in addition, sufficient sulfuric acid is added to combine with all the alkali which does not go to the preparation of the complex potassium zirconium fluoride. Further, a slight excess of soluble fluoride ion is added to insure the quantitative crystallization of the potassium zirconium fluoride.

The fluorination reaction is preferably carried out in the solution while both the fluoride material and the slurry is maintained at a temperature between 90° and 100° C. After all the fluoride ion has been added, the batch is diluted to an extent such that all of the potassium zirconium fluoride may be maintained in solution. This normally requires an amount of water roughly 4 to 5 times in volume that of the weight of the potassium zirconium fluoride being made. If iron is present in the ore, it is then necessary to make certain that all of the iron is made available in the form of ferrous iron, and this is readily accomplished through the medium of reduction with scrap iron in the acid solution. This iron precipitates as the hydrate and is eliminated as an insoluble residue. The schematic equations of the reactions are shown below. From this it is seen that a precipitate of calcium sulfate and silica is formed, while sodium sulfate and potassium zirconium fluoride are in solution at the elevated temperature.

1. $Ca_2ZrSiO_6 + 2KF + 4NaF + 4H_2SO_4 \rightarrow$
   $2CaSO_4 + 2Na_2SO_4 + K_2ZrF_6 + SiO_2 + 4H_2O$ 2. $Ca_2ZrSiO_6 + 6KF + 4H_2SO_4 \rightarrow$
   $2CaSO_4 + 2K_2SO_4 + K_2ZrF_6 + SiO_2 + 4H_2O$ 3. $CaZrO_3 + 2KF + 4NaF + 3H_2SO_4 \rightarrow$
   $CaSO_4 + 2Na_2SO_4 + K_2ZrF_6 + H_2O$ After decantation, settling, filtration, and the like, the precipitated material is separated from the desired end compound and the potassium zirconium fluoride is crystallized from solution. Addition of a small amount of KCl aids in quantitative precipitation of the desired compound. When carried out in accordance with the teachings indicated, yields in excess of 90% are readily obtained of high purity material, and such reaction takes place directly without too many special precautions. In general, any acid might be used in this reaction which forms a calcium derivative insoluble in water such as phosphoric and the like. It is also a requirement that the alkali metal compound be soluble in water. In the crystallization of potassium zirconium fluoride from the filtrate, the evaporation of the liquid prior to crystallization is continued until the first signs of crystals appear in the batch, after which the batch is cooled to permit the free formation of the desired product.

In metering the amount of acid to be used in the cases where the baddeleyite type of ore containing substantial amounts of iron are used, it is significant to note that it is not necessary to add acid to put the iron in solution. In the decomposition of the calcium zirconium silicate containing iron with sulfuric acid, the iron is obtained in the form of a water-insoluble hydrate which is relatively easily filtered away from the desired product.

The procedure described is also applicable to the formation of potassium fluozirconate from substantially pure zirconium oxides. In this case, the starting compound is in effect calcium zirconate and the amounts of reagents are metered in accordance with requirements stated before. Schematic representation of such an operation is indicated in Equation 3. The preparation of the calcium zirconate is substantially identical with that used for the calcium zirconium silicate and the 3/10 mole excess of calcium chloride is also used.

The reactions and procedures afore-described with respect to zirconium, also similarly apply to hafnium.

Having described my invention, the following examples are illustrative of its practice:

*Example 1.*—The zirconium raw material is a zirconium silicate beneficiated beach sand having the following analysis:

| | |
|---|---|
| $ZrO_2$ | 65.6 |
| $SiO_2$ | 33.7 |
| $Fe_2O_3$ | 0.1 |
| $TiO_2$ | 0.2 |
| $Al_2O_3$ | 0.1 |
| Others | 0.4 |

The zircon is ground to −325 mesh. 185 grams of this −325 mesh zircon is mixed with 200 grams of precipitated calcium carbonate, 25 grams of anhydrous calcium chloride is also added, and the batch is comminuted by passage through a swing hammer mill. It is then thrown into a rotary calciner maintained at a temperature of 2400° F. and the material is calcined to a sinter. It is subjected to the full heat of the calciner for at least an hour and is discharged and allowed to cool. The calcine is crushed and ground to −325 mesh. 800 cc. of water are added and a slurry is formed by intensive stirring. 410 grams of sulfuric acid of 98% grade is put in a beaker, and while the calcium zirconium silicate slurry is being vigorously stirred this acid is added as rapidly as possible and the violent stirring continued until the temperature begins to rise. As soon as the temperature begins to rise, the stirring is stopped and the reaction is allowed to continue of its own accord. A violently exothermic reaction takes place with the evolution of large quantities of steam, and after cooling a crumbly slightly gelatinous mass is obtained. This gelatinous mass is then mixed with 2 liters of water and the batch is stirred until the particles are rather thoroughly broken up. 170 grams of sodium fluoride and 125 grams of potassium fluoride are dissolved in one liter of boiling hot water. The slurry of sulfated calcium zirconium silicate is heated to 90 to 100° C., and the fluoride solution is then added continuously with stirring. After all the fluoride agent is added, the digestion of the solution is continued at a temperature of 90 to 100° C. for about one hour, after which the stirring is stopped and the solution is allowed to settle quietly while still maintaining the temperature in the range indicated. The clear liquor which is obtained as a result of this settling is decanted and the granular residue is washed on a filter with hot water containing 1% sulfuric acid and 1% potassium fluoride. The wash liquor and the decant are combined, and 10 grams of KCl in 50 cc. water added and the liquors are concentrated by evaporation until the first evidence of crystallization is observed. Liquor is then discharged to a crystallizing pan and allowed to cool. These crystals usually start forming when the volume of the solution has been reduced to about 1 liter. After cooling to about 10° C., the crop of crystals is removed from the solution and dried on the centrifuge, but they may be washed once or twice with water containing potassium chloride or potassium fluoride. After drying at 100° C., a yield of 265 grams is obtained which is roughly equivalent to a yield of about 94% theoretical. The purity is good, and a further degree of purification may be obtained by recrystallization from water by known procedure.

*Example 2.*—The zirconium raw material is a baddeleyite having an analysis as follows:

| | |
|---|---|
| Zirconium oxide | 76.7 |
| Iron oxide | 14.4 |
| Silicon dioxide | 7.2 |
| Aluminum oxide | 1.3 |
| Calcium oxide | 0.3 |
| Others | 0.1 |

This material is ground to —325 mesh. 200 grams of this finely ground material is mixed with 140 grams of precipitated calcium carbonate and 15 grams of anhydrous calcium chloride. The batch is calcined as in Example 1 in a rotary furnace at 2400° F. for about one hour and is then cooled and ground to —325 mesh. The cooled calcine is ground to —325 mesh and is then mixed with 750 cc. of water and stirred. To the rapidly stirred slurry, 360 grams of 98% sulfuric acid is added as rapidly as possible and the stirring continued until the reaction is initiated. Stirring is stopped and a violently exothermic reaction takes place with copious evolution of steam. After cooling, the somewhat gelatinuous mass is broken up and dispersed in 2000 cc. of water. The batch is heated to a temperature of approximately 90° C. and the vigorous stirring continued. A solution containing 210 grams of sodium fluoride and 145 grams of potassium fluoride in roughly 1 liter of water is heated to 90° C. and is added slowly, but continuously, to the rapidly stirred complex calcium zirconium silicosulfate. After the addition of the fluoride is complete, the batch is then digested at a temperature between 90 and 100° C. and with stirring for a period of about an hour, after which it is diluted to a total volume of 3500 cc. 10 grams of powdered iron are added and the digestion is continued for about 15 minutes more. While still maintaining the batch at the digestion temperature of 90° to 100° C., the precipitate is allowed to settle and the clear liquid which thus forms is decanted into an evaporator. The precipitate is washed by a second decantation, followed by washing on the filter, in each case using a wash water consisting of 1% sulfuric acid and 1% potassium fluoride. The combined filtrates and decants in wash water are then evaporated after the addition of 10 grams of KCl, until the first signs of crystallization appear, which usually develops at a volume roughly 1 liter. After this the batch is cooled to obtain a crop of crystals of the desired compound potassium zirconium fluoride.

The precipitate is dark brown color due to the presence of iron hydrate, and consists of iron hydrate, calcium sulfate and silica. The crystals obtained after crystallization at approximately 10° C., are dewatered on the centrifuge, and washed once with the sulfuric acid KF solution and are then dried at 100° C. A yield of 310 grams of product is obtained which is equivalent to a yield of approximately 94%.

*Example 3.*—A zirconium oxide is provided in —325 form. This zirconium oxide has the following analysis:

| | |
|---|---|
| $ZrO_2$ | 94.1 |
| $SiO_2$ | 5.2 |
| $TiO_2$ | 0.2 |
| $Fe_2O_3$ | 0.1 |
| $Na_2O$ | 0.2 |
| Others | 0.2 |

200 grams of this —325 mesh product are mixed with 170 grams of precipitated calcium carbonate and 15 grams of anhydrous calcium chloride. The batch is passed through a micropulverizer, and is then calcined as indicated in Example 1, namely for about 1 hour at 2400° F. The cool calcine is ground to —325 mesh, and then is dispersed in 800 cc. of water. While being stirred vigorously, 435 grams of sulfuric acid is added rapidly. As soon as the exothermic reaction commences, the stirring is stopped and the decomposition reaction allowed to continue. The treatment then proceeds as in Example 1 except that the amount of sodium fluoride is 257 grams and the amount of potassium fluoride is 180 grams. The yield of crystals developed in this instance is 410 grams after drying at 100° C. which is equivalent to a recovery of approximately 94%.

Other modes of applying the principle of the invention may be employed, change being made as regards the details described, provided the features stated in any of the following claims or the equivalent of such be employed.

I, therefore, particularly point out and distinctly claim as my invention:

1. A method of producing an alkali metal double fluoride of a metal of the group consisting of zirconium and hafnium which comprises: calcining a mixture of a finely divided ore of a metal of said group with an amount of an alkaline earth compound from the group consisting of alkaline earth oxides and alkaline earth carbonates, sufficient to furnish one mol of alkaline earth oxide for each mol of the oxide of said metal and each mol of silica in said ore and about 10 molar percent of an alkaline earth chloride based on the molar amount of the alkaline earth compound in the mixture at a temperature of about 2200 to 2400° F. for between about 1 and 3 hours to form an alkaline earth oxide derivative of said ore; forming a slurry of the derivative in water; adding an acid thereto, the anion of which forms a substantially water-insoluble salt of said alkaline earth metal; forming a stirrable suspension of the resulting product; adding at least one water-soluble fluoride to the suspension while the temperature thereof is between about 90° and 100° C., and thereafter maintaining the temperature of said suspension for a period of about 1 hour; separating the insoluble alkaline earth metal compound and any other insolubles from the solution and recovering the alkali metal double fluoride of said metal from the solution by crystallization.

2. A method of producing an alkali metal double fluoride of a metal of the group consisting of zirconium and hafnium which comprises: calcining a mixture of a finely divided ore of a metal of said group with an amount of an alkaline earth carbonate molarly equal to the total molar amount of the oxide of said metal and of the silica in said ore, and with about 10 molar percent of an alkaline earth chloride based on the molar amount of the alkaline earth carbonate in the mixture at a temperature of about 2200 to 2400° F. for between about 1 and 3 hours to form an alkaline earth metal oxide derivative of said ore; forming a slurry of the derivative in water; adding sulfuric acid thereto; forming a stirrable suspension of the resulting product; adding at least one water-soluble fluoride to the suspension while the temperature thereof is between about 90° and 100° C., and thereafter maintaining the temperature of said suspension for a period of about 1 hour; separating the alkaline earth metal sulfate and other insolubles from the solution and recovering the alkali metal double fluoride of said metal from the solution by crystallization.

3. A method of producing an alkali metal double fluoride of a metal of the group consisting of zirconium and hafnium which comprises: calcining a mixture of a finely divided ore of a metal of said group with an amount of calcium carbonate molarly equal to the total molar amount of the oxide of said metal and of the silica in said ore and with about 10 molar percent of calcium chloride based on the molar amount of the calcium carbonate in the mixture at a temperature of about 2200 to 2400° F. for between about 1 and 3 hours to form a calcium oxide derivative of said ore; forming a slurry of the derivative in water; adding sulfuric acid, the anion of which forms a substantially water-insoluble salt of said alkaline earth metal; forming a stirrable suspension of the resulting product; adding at least one water-soluble fluoride to the suspension while the temperature thereof is between about 90° and 100° C., and thereafter maintaining the temperature of said suspension for a period of about 1 hour; and separating the insoluble calcium sulfate and other insolubles from the resultant solution; and recovering the alkali metal double fluoride of said metal from the solution by crystallization.

4. A method of producing an alkali metal double fluoride of zirconium which comprises: calcining a mixture of a finely divided zirconium ore with calcium carbonate in an amount sufficient to furnish one mol for each mol of zirconia and each mol of silica in the ore and with about 10 mol percent of calcium chloride of the molar percent of the calcium carbonate in the mixture at a temperature of about 2200 to 2400° F. for between about 1 and 3 hours to form a calcium oxide derivative of said ore; forming a slurry of the derivative in water; adding sulfuric acid thereto; forming a stirrable suspension of the resulting product; adding at least one water-soluble fluoride to the suspension while the temperature thereof is between about 90° and 100° C., and thereafter maintaining said suspension at said temperature for a period of about 1 hour; separating the calcium sulfate and any other insolubles from the resulting solution and recovering the alkali metal zirconium double fluoride by crystallization.

5. A method of producing an alkali metal double fluoride of zirconium which comprises: calcining a mixture of a finely divided zirconium ore with a molar amount of an alkaline earth compound from the group consisting of alkaline earth oxides and alkaline earth carbonates equal to the total number of mols of zirconia and of silica in the ore and about 10 molar percent of an alkaline earth chloride based on the molar amount of the alkaline earth compound in the mixture at a temperature of about 2200 to 2400° F. for between about 1 and 3 hours to form an alkaline earth metal oxide derivative of said ore; forming a slurry of the derivative in water; adding concentrated sulfuric acid thereto with stirring; forming a stirrable suspension of the resulting product; adding at least one water-soluble fluoride to the suspension while the temperature thereof is between about 90° and 100° C., and thereafter maintaining the suspension at said temperature for a period of about 1 hour; separating the alkaline earth metal sulfate and other insolubles from the resultant mixture by decantation and filtering of the solution; and thereafter recovering the alkali metal zirconium double fluoride from the filtrate by crystallization.

References Cited in the file of this patent

UNITED STATES PATENTS

| | | |
|---|---|---|
| 1,261,948 | Loveman | Apr. 9, 1918 |
| 1,307,881 | Rosenhahn | June 24, 1919 |
| 1,340,888 | Gordon | May 25, 1920 |
| 1,454,564 | Ruff | May 8, 1923 |
| 1,609,826 | Kinzie | Dec. 7, 1826 |
| 1,658,807 | Kinzie | Feb. 14, 1928 |
| 1,681,195 | Russberg et al. | Aug. 21, 1928 |
| 2,076,080 | George et al. | Apr. 6, 1937 |
| 2,568,341 | Kawecki | Sept. 18, 1951 |

FOREIGN PATENTS

| | | |
|---|---|---|
| 460,410 | Great Britain | Jan. 27, 1937 |
| 574,832 | Great Britain | Jan. 22, 1946 |